July 23, 1968 J. W. MATTINGLY 3,393,673
ORAL HYGIENE APPARATUS
Filed Nov. 23, 1964 3 Sheets-Sheet 1
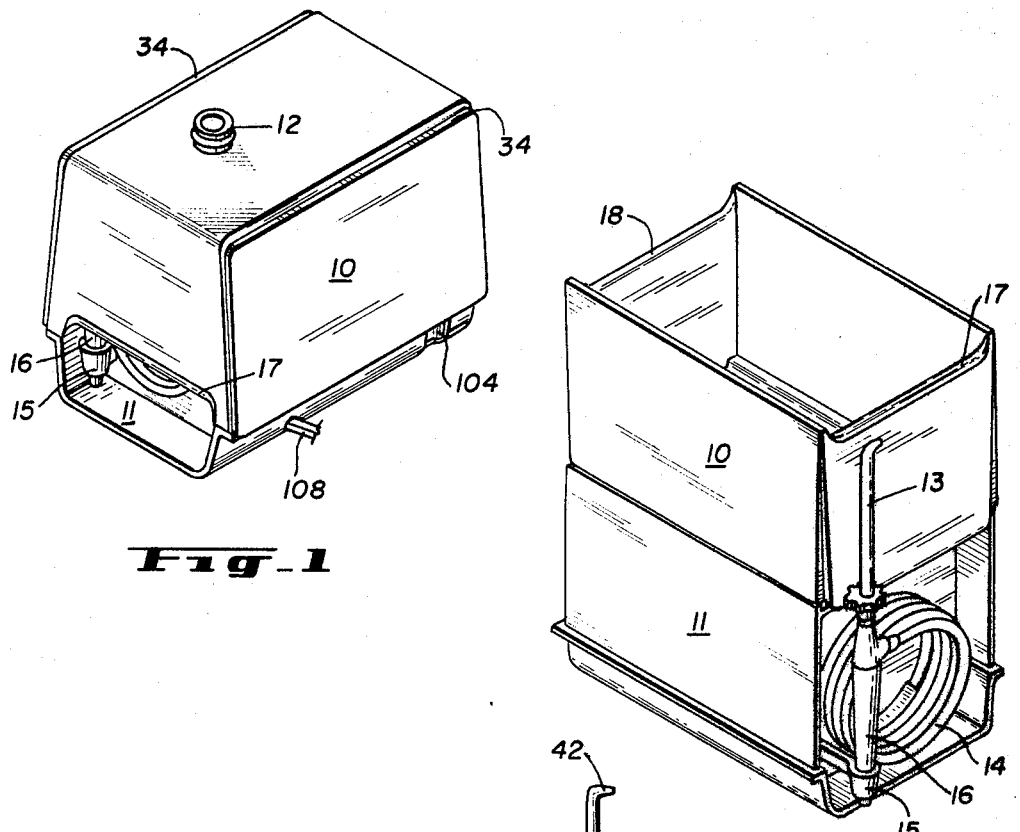
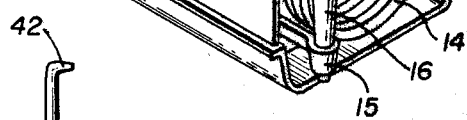
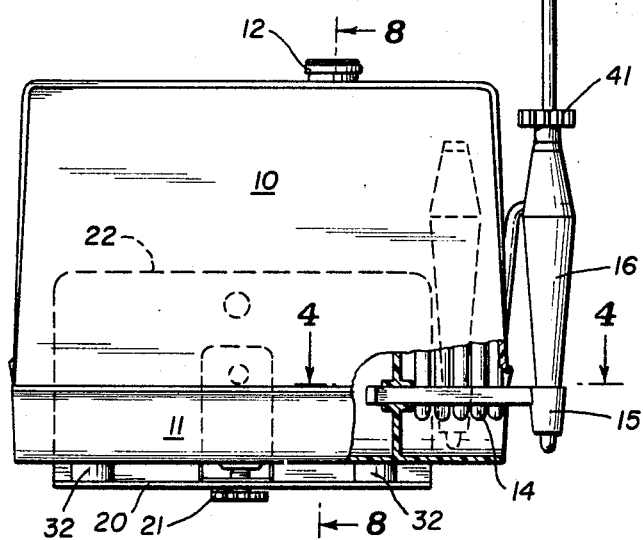
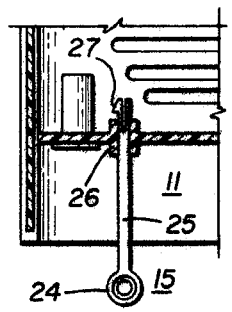
INVENTOR.
John W. Mattingly
BY
ATTORNEYS July 23, 1968  J. W. MATTINGLY  3,393,673
ORAL HYGIENE APPARATUS
Filed Nov. 23, 1964  3 Sheets-Sheet 2
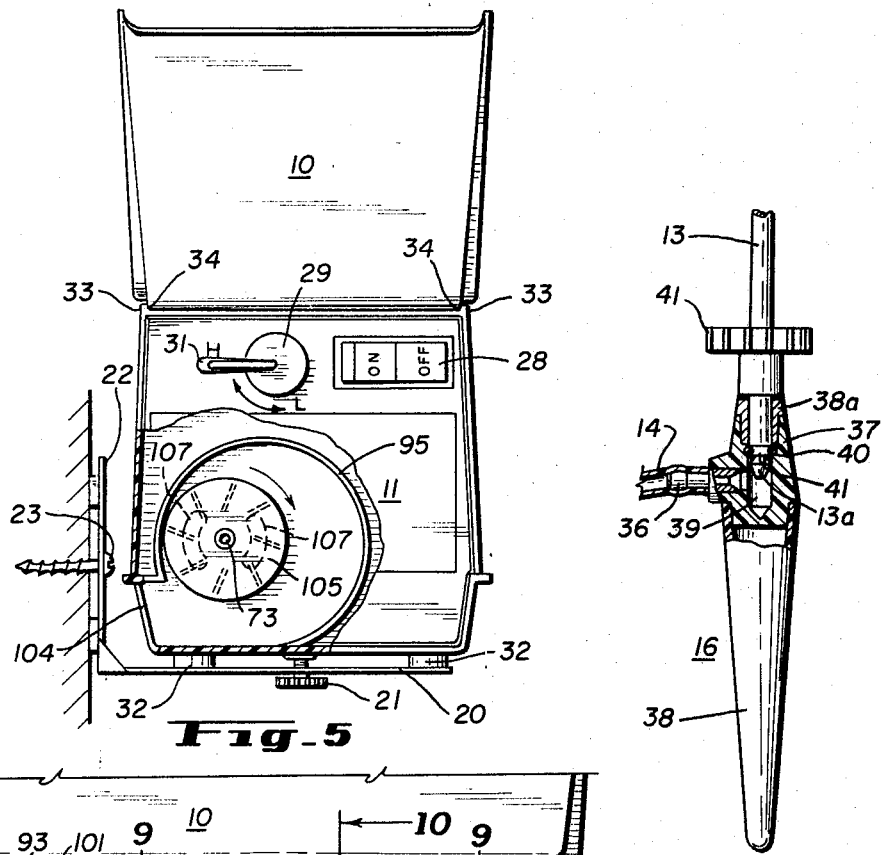
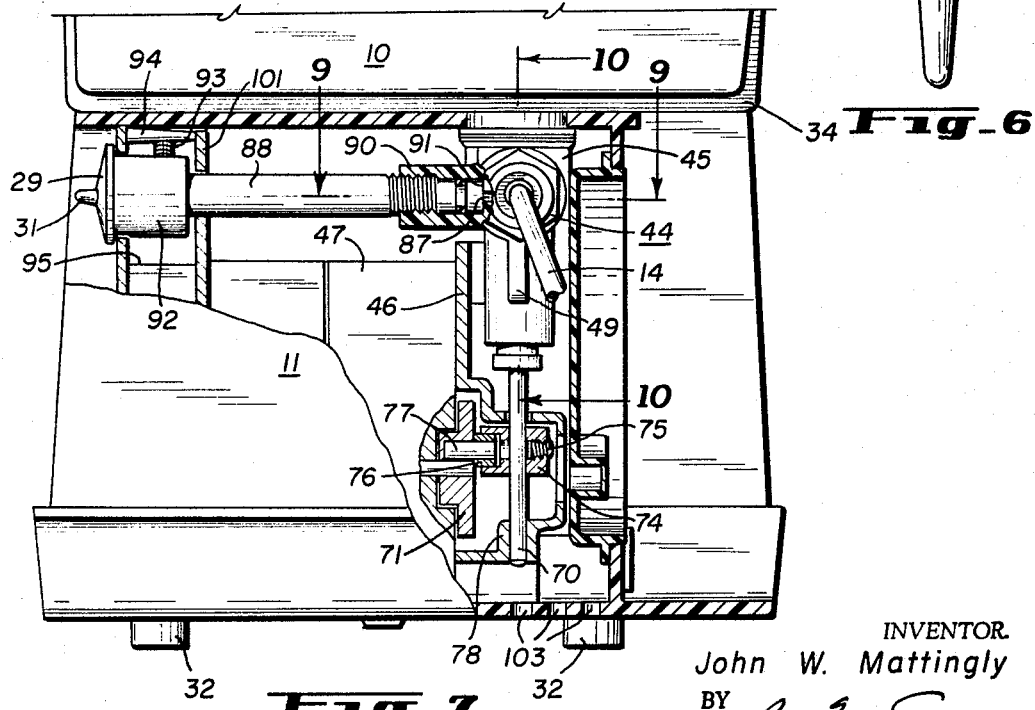
INVENTOR.
John W. Mattingly
BY
ATTORNEYS July 23, 1968  J. W. MATTINGLY  3,393,673
ORAL HYGIENE APPARATUS
Filed Nov. 23, 1964  3 Sheets-Sheet 3

INVENTOR.
John W. Mattingly
BY
ATTORNEYS

United States Patent Office 3,393,673
Patented July 23, 1968

3,393,673
ORAL HYGIENE APPARATUS
John W. Mattingly, Fort Collins, Colo., assignor to Aqua-Tec Corporation, Denver, Colo., a corporation of California
Filed Nov. 23, 1964, Ser. No. 412,954
21 Claims. (Cl. 128—66)

ABSTRACT OF THE DISCLOSURE

An oral hygiene appliance comprises a motor pump unit for producing a pulsating stream of water and a cover for the unit which may be inverted to act as a water reservoir, a gravity biased valve is provided in the outlet of the reservoir so that the reservoir will retain water. When the cover is inverted as the reservoir it is placed in position registering with the inlet of the pump and the valve is opened automatically when the reservoir is seated in position on the pump unit. The pump unit comprises three chambers, an inlet chamber, a piston cylinder and a pump chamber the latter two being at right angles to one another; an intake valve is located in the pump chamber and is mounted in a streamlined support. Mounting ears integral with the pump body are provided for mounting the pump unit and one of the ears is integral with the walls of the pump chamber and cylinder and reinforces these portions as well as acting as a support for the pump.

---

This invention relates to oral hygiene apparatus of the water jet type for cleaning the teeth and massaging the gum tissues and particularly to an improved water jet apparatus for the intermittent pulse type. This invention is an improvement on the invention of a copending application of John W. Mattingly Ser. No. 108,561, filed May 8, 1961 now Patent No. 3,227,158 issued on Jan. 4, 1966.

Apparatus for producing a small jet of water comprising intermittent pulses or slugs of water discharged at substantial velocity has been found to be highly effective in dislodging foreign matter from the teeth and gum tissues. This jet is particularly useful in cleaning the interdental spaces and the spaces between the teeth and the gums. At the same time by spacing the pulses sufficiently to allow rebound of the tissue between pulses, a highly effective massaging action is obtained. An intermittent jet having the pulses or slugs of water spaced in this manner and discharged at rates of the order of 1200 pulses per minute has been found to be very effective for this use.

It is an object of the present invention to provide an improved oral hygiene apparatus of the intermittent liquid pulse type.

It is another object of this invention to provide an oral hygiene apparatus of the pulsed water jet type including an improved arrangement for delivering water to the apparatus.

It is another object of this invention to provide an oral hygiene apparatus including an improved assembly for the supply and control of the liquid employed therein.

Briefly, in carrying out the objects of this invention in one embodiment thereof, an intermittent pulse liquid jet apparatus is provided wherein an electric motor and liquid pump are mounted in a base arranged to be enclosed in a cover comprising an inverted liquid reservoir. The reservoir, when turned upright, may be filled with liquid and then placed on top of the base and in communication with the pump intake opening on top of the base. The connection is made though a gravity closed valve in the bottom of the reservoir which is opened when a boss or fitting in the bottom of the reservoir is pressed into the pump inlet. The pump is of the reciprocating type and discharges directly into the side of an elongated chamber having a valved inlet at one end and an open outlet at the other. The outlet discharges directly into a helically coiled resilient tube provided with a removable jet nozzle. A controllable bypass from the pump chamber to the intake connection is employed to adjust the intensity of the pulsed discharge at the nozzle.

The features of novelty which characterize this invention are pointed out with particularity in the claims annexed to and forming a part of this specification. The invention itself, however, both as to its organization and its manner of operation, together with further objects and advantages, will best be understood from the following description taken in connection with the accompanying drawings which:

FIG. 1 is a perspective view of an oral hygiene apparatus embodying the invention;

FIG. 2 is a perspective view of the device of FIG. 1 shown from the left-hand side of FIG. 1 with the cover removed and inverted for use as a water reservoir;

FIG. 3 is a side elevation view of the apparatus of FIG. 1 partly broken away to show the holder for the nozzle assembly;

FIG. 4 is a detail view of the nozzle support of FIG. 3;

FIG. 5 is an end view of the apparatus with the reservoir in place as in FIG. 2 showing the other end of the apparatus when supported on the shelf bracket;

FIG. 6 is a detail view, partly in section, of the nozzle assembly;

FIG. 7 is an enlarged side elevation view partly in section showing the pump drive and control;

Figure 8:
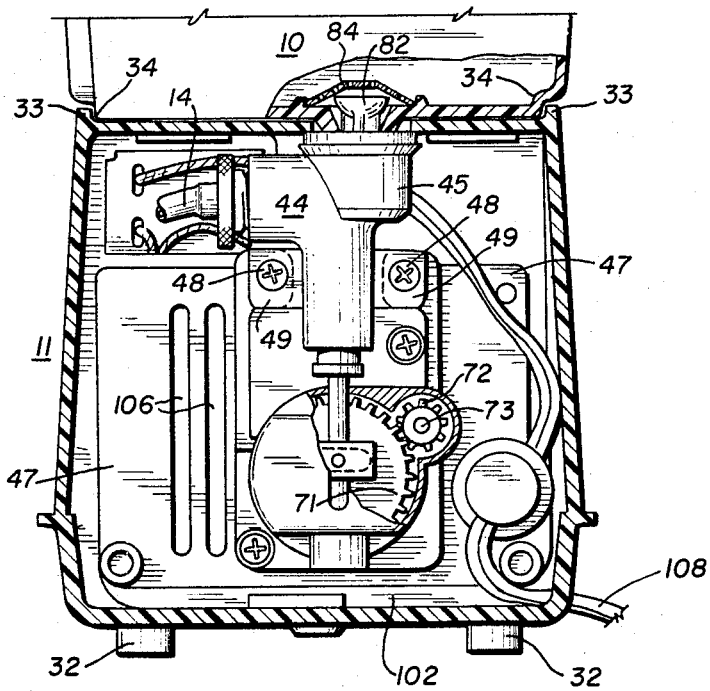
FIG. 8 is an enlarged end elevation view of the device with the case shown in section along the line 8—8 of FIG. 3.

Referring now to the drawings, the apparatus illustrated in FIGS. 1 and 2 comprises an inverted container 10 placed over a motor and pump assembly indicated generally at 11. The container when inverted as shown in FIG. 2 provides a reservoir for water which is supplied to a pump in the assembly through an outlet boss or fitting 12 in the bottom of the container.

When the pump is in operation, a jet comprising intermittent pulses of water is delivered through a nozzle 13 connected to the pump outlet through a coiled tubing 14. This tubing is made of a resilient plastic which is relatively non-stretchable and is formed in a spring-like coil as shown. This coiled arrangement of the tubing allows the nozzle to be moved away from its position on a bracket 15 and used for cleaning and massaging treatment of the teeth and gums.

The nozzle assembly includes a handpiece 16 on which is detachably and rotatably secured the nozzle 13 and which handpiece fits in the bracket 15 as shown. The bracket 15 has been shown in FIG. 2 as drawn out from its position in FIG. 1, which position is such that the container may be inverted and placed over the pump unit as a cover in the position clearly shown in FIG. 3 with the handle 16 and nozzle 13 outside the cover. The alternative inside position of the handpiece 16 is indicated in dotted lines.

The cover is formed with elongated recesses or relieved portions 17 and 18 which provide openings for affording circulation of air between the unit 11 and the cover when the cover is in the position of FIG. 1. Further ventilation is afforded by a valve arranged in a manner to be described below within the fitting 12 which opens when the cover is inverted and allows circulation of air through the top wall of the cover. The circulation of air while the cover is in place affords ready drying of the parts of the apparatus after use with the cover in place.

In FIG. 3 the unit is shown mounted on a wall bracket 20 to which it is secured by a thumbscrew 21 engaging threads in the bottom of the unit 11. The wall bracket 20 includes a vertical portion indicated in dotted lines at 22 which is attached to the wall by screws as indicated at 23 in FIG. 5. Thus the cover may be placed over the unit while it is supported on the bracket 20 and the nozzle may rest outside in the support 15, the lower tapered end of the handpiece 16 fitting into a conforming opening in the support.

The support 15 as indicated in FIG. 4 comprises a conical supporting head 24 and a shaft 25. This support is constructed of resilient plastic or other suitable material and passes through a boss 26 in the plastic wall of the unit 11, the far end of the shaft 25 being bifurcated as indicated so that it may be compressed to allow a catch or stop 27 to clear the opening in the boss 26 and thereafter to limit the outward movement of the support from the casing.

FIG. 5 shows the control end of the unit 11 near the upper portion of which is arranged an electric switch button 28 and a liquid jet intensity control 29 having a handle 31 for rotating the control from its high intensity position as shown to a lower position adjacent the letter L which is the low intensity position.

As shown in FIGS. 3 and 5, the unit 11 is provided with four rubber feet 32 which hold the unit securely on the shelf 20 when the thumbscrew 21 is tightened. As shown in FIGS. 1 and 5, the unit 11 has low ridges 33 and the container 10 is provided with shoulders 34 which cooperate as positioning guides to hold the bottom of the container 10 in alinement with the unit 11. When the container is in this position, the boss 12 enters an intake opening in the top of the unit 11 as indicated at 35 in FIG. 10. Thus the cover is positioned as a reservoir to supply water to the pump intake.

The discharge from the pump is controlled as to intensity, as started heretofore, by operation of the handle 31, and the tube 14 is made of relatively non-expansible material to minimize damping of the pulsations as they pass through the tube. The tube terminates at the handpiece 16 where it is attached by means of a metal fitting 36 which is pressed into a rigid plastic base part 37 of the handpiece. The part 37 is attached to the rigid plastic tapered body portion of the handpiece, indicated at 38, by means of solvent bonding or sonic welding. The base part 37 is provided with a central cylindrical water passage 39 enlarged at its upper end to provide a seat or annular shoulder for containing an O-ring seal 40 and a metal fitting 38a is pressed into base part 37 to receive the nozzle 13 and also to complete an annular groove in which the O-ring 40 is captured. Nozzle 13 is constructed of rigid plastic and is provided with a fluted knob 41 fixed thereon and spaced from the lower end thereof. The lower end is formed to provide an annular groove for engaging the O-ring 40 and its tip is shaped to provide a double tapered or ball shaped configuration, as indicated at 13a, for facilitating movement into and out of engagement with the O-ring, the end 13a being forced through the O-ring by pushing or pulling. The O-ring 40 is made of a resilient material, and allows compression for passage of the ball shaped end 13a while providing a seal when the O-ring expands into its annular groove or seat. The nozzle may readily be changed and affords use of the apparatus by several members of the family each of which may use his individual nozzle. The arrangement of the O-ring is such that the nozzle fits rotatably within the handpiece and may easily be turned with thumb and index fingers on the knob 41 so that the tip of the nozzle indicated at 42 may readily be turned in any direction while the nozzle is in the mouth.

Figures 9, 10:
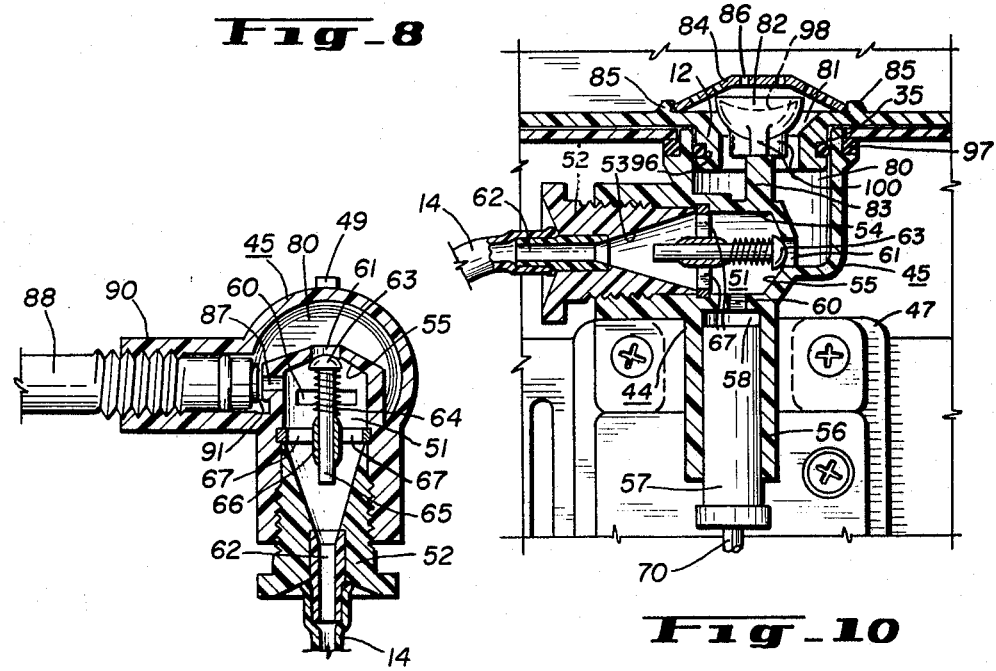
FIG. 9 is a sectional plan view through the pump assembly taken along the line 9—9 of FIG. 7.
FIG. 10 is a sectional elevational view of the pump assembly taken along the line 10—10 of FIG. 7.

The arrangement of the pump to provide the required pulsed jet stream and the manner in which the intensity of the pulses are controlled will be understood more readily from the illustration in FIGS. 7 through 10. As indicated in FIG. 7, a pump 44 formed in a block 45 of substantially rigid plastic material is secured on a metal frame 46 attached to an electric motor 47, the pump being attached to the frame by screws 48 passing through ears 49 formed integrally with the block. It will be observed that left hand ear 49 as viewed in FIGS. 8 through 10 is integral with two cylindrical portions of the block which are a right angles to one another and thus reinforces both portions. The block 45 as shown in FIG. 10 is formed to provide a pump chamber 51 which is of generally teardrop configuration and is completed and closed by a fitting 52 having its inner walls toward the chamber 51 formed in conical configuration as indicated at 53 thereby cooperating with a cylindrical wall portion 54 extending about one-half the length of the chamber and a substantially spherical or shallow conical wall portion 55 to form the teardrop configuration of the chamber 51.

A cylinder 56 is formed integrally with the block 45 and extends downwardly from the chamber 51 and has a piston 57 mounted for reciprocating movement therein. The cylinder chamber indicated at 58 communicates with the chamber 51 through a port 60 which is of rectangular configuration as indicated in FIG. 9. The port extends across the diameter of the cylinder chamber 58 and discharges into the chamber 51 normal to the longitudinal axis of the chamber. The chamber 51 is provided with an intake port 61 and a discharge port 62 which are in alinement and concentric with the longitudinal axis of the chamber 51. The port 61 is provided with an intake valve 63 biased toward the port by a helical spring 64 carried on a valve stem 65 which is slidably mounted in a hub 66 of a spider having a plurality of spokes 67. The hub is rounded or streamlined longitudinally and is of round cross section to provide minimum turbulence due to the passage of liquid from the port 61 through the chamber 51.

The piston 57 is constructed of plastic which provides low friction between the piston and the walls of the cylinder 56, and a steel rod 70 is securely attached to the piston 57 concentrically along the longitudinal axis thereof and is reciprocated by a Scotch yoke mechanism coupling the rod 70 and a driving gear 71 driven by the motor 47. The gear 71 is driven by the motor through a pinion gear 72 rigidly mounted on the motor shaft indicated at 73 in FIG. 8. The Scotch yoke mechanism includes a channel member or guide 74 rigidly attached to the rod 70 by a set screw 75. A cross head 76 is slidably mounted in the channel 74 and is pivoted on the gear 71 on an eccentric stub shaft 77. Thus when the gear is rotated the slide 76 moves back and forth while reciprocating motion is transmitted directly to the rod 70. The far end of the rod is mounted in a sliding bearing 78 formed in the metal frame 46 as indicated in FIG. 7.

During the operation of the pump, piston 57 is reciprocated and on its downstroke as viewed in FIG. 10 draws water into the cylinder chamber 58 through the port 60. The water enters the chamber 51 during the downstroke through the intake port 61, the valve 63 moving to the left when the pressure is decreased in the chamber 51. On the return stroke the valve 63 closes and water is driven through the port 60 into the chamber 51 and out through the discharge port 62 and the tubing 14. On the downstroke of the piston 57 thereafter, water is again drawn into the port 61 and, because of the inertia of the volume of water moving toward the port 62 through the chamber 51 and traveling through the tubing 14, the water drawn into the chamber 51 comes predominantly through the port 61 and no substantial quantity of water is withdrawn from the tubing 14 through the discharge port 62. The inertia effect also results in the passage of some of the water from the chamber 51 into the tubing 14 while the valve 63 is opened. This is indicated from tests of the pump which show that a greater volume of water is discharged than would result from the reciprocation of the piston 57 alone. However, the flow from the nozzle is interrupted between pulses for an interval which allows the user's gun tissue to rebound.

The generally teardrop configuration of the chamber 51 together with the location of the intake and discharge ports 61 and 62 and the transverse arrangement of the cylinder chamber 58 increases the effectiveness of the inertia of the water flowing through the chamber 51 and tube 14 for maintaining a flow into the chamber 51 when the pump is on its intake stroke. An exhaust valve is not necessary for the discharge port 62 and a greater volume of water is circulated than that discharged from the cylinder chamber 58. The elongated slot configuration of the pump port 60 further aids this inertia action by its guidance and restriction of the flow path between the cylinder chamber 58 and the chamber 51.

In order to control the intensity of the pulses or slugs of liquid discharged through the tube 14, a bypass is provided between the chamber 51 and the intake side of the port 61.

The block 45, as shown in FIGS. 9 and 10, is formed to provide an intake chamber 80 extending from the inlet port 61 upwardly around the walls at the head of the pump chamber 51 and in direct communication with the water in the reservoir 10 through the reservoir outlet indicated at 81 which is within the fitting 12. The reservoir communicates directly with the chamber 80 when a valve 82 is held upwardly by engagement with a post 83 formed on the upper side of the walls of the pump chamber 51.

The valve 82 is the valve mentioned heretofore which opens by gravity when the container 10 is turned with its open side downward as in FIG. 1 and the spacing of the valve from the opening 81 allows circulation of air when the container is in this positon. In order to minimize the entry of foreign matter into the valve opening and also to hold the valve near the opening when the container is inverted, a screen 84 is secured over the opening 81 by three lugs or detents 85. The disc 84 is preferably made of plastic material formed with a multiplicity of holes 86 to allow passage of the water and air.

The chamber 80 surrounds the upper right-hand end of the walls of the chamber 51 and extends downwardly substantially below the horizontal diameter of the cylindrical portion 54. The bypass above referred to is provided by a port extending through the wall of the cylindrical portion 54 of the chamber 51 on the side adjacent the control 29 as viewed in FIG. 7, this port being indicated at 87 in FIGS. 7 and 9.

In order to control the port, a rod 88 is threaded into a cylindrical boss 90 at the side of the block 45 and concentric with the port 87. The rod 88 terminates in a valve face 91, a flat being provided about the port 87 for this purpose. When the rod 88 is turned, it moves out on its threads in the boss 90 and provides for the escape of liquid through the port 87 back to the inlet 80. By varying the amount of liquid bypassed in this manner, the intensity of the liquid slugs discharged through the exhaust port 62 and tubing 14 may readily be controlled.

The control 29 comprises a knob having a hub 92 secured to the rod 88 by a set screw 93. The set screw 93 is positioned to engage a bar 94 extending outwardly from the plastic wall of the unit 11, the top of the set screw 93 being on the far side of the bar 94 as viewed in FIG. 7. As the handle is turned in a counterclockwise direction as viewed in FIG. 5, the set screw moves downwardly and, when the handle reaches the position near the letter L, the set screw 93 strikes the top of a fan scroll indicated at 95. Thus the rotation of the control handle 31 is limited in both directions, the entire control required being secured within the range of movement indicated in FIG. 5.

The discharge of liquid from the pump chamber 51 through the bypass thus produces a damping effect on the discharge through the port 62 and the body of water in the reservoir helps to effect this damping action while the pump is in operation, the water discharged from the bypass being free to flow upwardly into the reservoir, the valve 82 being held open by the post 83.

The arrangement whereby the reservoir 10 is mounted on the unit 11 is such that the valve 82 is not opened until the boss 12 has been sealed to the wall of the inlet opening 35 of the pump. This is accomplished by providing an O-ring gasket 96 on the boss 12 in a position to engage an annular beveled face of the wall about the opening 35 when the reservoir is lowered into position before the post 83 engages the valve 82. Upon further movement, the post 83 lifts the valve 82 and the O-ring is slid into its lowermost position as shown in FIG. 10. The intake 35 of the pump is sealed to the top wall of the pump casing by a gasket 97 which is preferably of square cross section.

The valve 82 comprises a hemispherical main body having a dished cup 98 formed in its upper surface and a stem comprising four legs or extensions 100 providing a right angle cross which rests on the post 83 and leaves substantial spacing on all sides for the flow of water when the valve is lifted to its upper position.

The details of construction of the motor 47 are not essential to an understanding of the present invention and have, therefore, not been illustrated. The motor as illustrated is of generally rectangular configuration and is supported on a metal end plate 101 in a position such that it is spaced from the bottom wall of the unit as indicated at 102 in FIG. 8. This spacing allows air to circulate over the motor as it passes from intake openings 103 in the bottom wall of the unit. Forced circulation of the air is provided by the fan in the scroll 95 and is discharged from the scroll through an opening 104 in the lower wall of the unit by operation of an impeller 105 within the scroll. Impeller 105 is driven directly from the motor on shaft 73. Air entering the casing from the bottom moves into the motor housing through vertical slots 106 provided in the motor housing adjacent the pump 45 and is discharged from the motor casing through segmental slots 107 providing communication with the scroll 95.

When the apparatus is to be used it is connected to an electric outlet through the usual plug (not shown) connected to a cord 108 entering the lower wall of the unit. The switch 28 is then pressed to its "on" position and water placed in the reservoir 10 on top of the unit is then pumped through the unit and out the tubing 14 to the nozzle which has been placed in the mouth of the user adjacent the teeth. The mouth is held open and the nozzle moved slowly over the gums and directed into the interdontal spaces and both massages gums and cleans the teeth and the area between the teeth and gums. The pulsed action of the jet effectively removes foreign matter and the inherent action of the pulsed jet provides a highly effective massaging of the gum tissues.

When the cleaning and massaging operation has been completed or the water exhausted from the reservoir, the switch is turned off and the nozzle removed from the mouth. The resilient spring-like action of the tube is such that the tube contracts into a compact area and the handpiece 16 is returned to its position on the support 15.

While the invention has been described in connection with a specific construction of one embodiment, various modifications and applications will occur to those skilled in the art. Therefore it is not desired that the invention be limited to the details of construction illustrated and described and it is intended by the appended claims to cover all modifications which fall within the spirit and scope of the invention.

I claim:
1. A liquid pump of the pulsed discharge type comprising a block having therein a chamber of generally teardrop shape provided with an intake port centrally of its larger end and an exhaust port at its opposite end, said ports being in alinement along the longitudinal axis of said chamber, an inlet valve for said intake port having a stem extending along said longitudinal axis, means including a mounting for said stem arranged concentrically of said longitudinal axis and having its outer surface streamlined for flow of fluid thereover from said intake port, a cylinder positioned along an axis transverse to said longitudinal axis near the larger end of said chamber and in communication with said chamber, a piston in said cylinder, means for reciprocating said piston for alternately drawing liquid through said intake port and producing high pressure pulses in said chamber whereby a pulsed flow of liquid is produced through said exhaust port, means for supplying liquid to said intake port, and means for conducting liquid from said exhaust port to a point of use.

2. A liquid pump of the pulsed discharge type as set forth in claim 1 including means providing an elongated rectangular port between said cylinder and said chamber and extending transversely of the longitudinal axis of said chamber, said rectangular port providing said communication for the passage of liquid between said cylinder and said chamber.

3. A liquid pump of the pulse discharge type comprising a housing, a block arranged in said housing and having a chamber provided with an intake port and an exhaust port, said block having an inlet passage in communication with said intake port and opening upwardly, means for preventing reverse flow of fluid through said intake port, pump means for producing a flow of liquid from said chamber through said exhaust port, a detachable container of a configuration to fit about said housing as a cover when inverted, said container having an outlet in the bottom thereof positioned to register with the opening inlet passage of said block when said container is placed upright on said housing for supplying liquid to said intake port, means sealing said container and said inlet passage about said bottom outlet for preventing leakage therebetween, a gravity biased valve in said outlet of said container positioned to close said outlet when said container is in its upright position, means adjacent said inlet passage for engaging and opening said valve upon movement of said container into position for sealing said inlet passage, said container and said housing being of a configuration to provide openings adjacent the lip of the container when said container is inverted and in position as a cover for said housing, said valve in the inverted position of said container falling to its open position whereby when said container is placed about said housing the open outlet in said container affords a circulation of air and facilitates the drying of said container and housing, and means for conducting liquid from said exhaust port to a point of use.

4. A liquid pump of the pulsed discharge type comprising a housing as set forth in claim 3 wherein the bottom of said container and the top of said housing are provided with positioning guides for facilitating the connection of the outlet of the container and the inlet of the housing and for minimizing the dislodging of the container from the housing.

5. A liquid pump of the pulsed discharge type comprising a housing as set forth in claim 3 wherein said container is provided with a boss about said opening and said housing includes a recess about said inlet passage shaped to receive said boss and wherein said sealing means is positioned for engagement by said boss upon placing said container in position on said housing and for maintaining a seal while said container is pressed further into position for release of said valve.

6. A liquid pump of the pulsed discharge type comprising a housing having therein a pump for producing intermittent pulses of liquid, reservoir means for supplying liquid to said pump, and means including a coiled tube of stiff resilient plastic material and a nozzle fixture for conducting liquid from said pump to a point of use, means for mounting said tube in a coiled retracted position, receptacle means on said pump adjacent said coiled tube for retaining said nozzle fixture and said tube in position when not in use, said reservoir means including a container shaped to enclose the upper portion of said housing as a cover and in its upright position acting as a reservoir for liquid to be pumped, means for connecting said pump and said container for conducting liquid from said container to said pump, said container when inverted and placed over said pump enclosing said tube and nozzle fixture, and means affording movement of said fixture receptacle means outwardly from said pump to a position on said housing beyond said container whereby said nozzle fitting may be placed in said fixture outside said container and whereby said coiled tube affords placing of said container between two turns of the coil while maintaining continuous connection with said nozzle fixture when in said extended position.

7. A liquid pump comprising a housing, a block arranged in said housing and having a pump chamber provided with an intake port and an exhaust port, said housing having an inlet passage opening upwardly and in communication with said intake port, pump means for producing a flow of liquid from said chamber through said exhaust port, a detachable cover telescoping over and enclosing a substantial volume of said housing, said cover when removed and inverted constituting a container for liquid, means for positioning and supporting said cover in its inverted position on said housing and for providing communication between said inverted cover and said inlet passage whereby operation of said pump means produces a flow of liquid from said inverted cover and through said exhaust port, and means for conducting liquid from said exhaust port to a point of use.

8. A liquid pump as set forth in claim 7 wherein said means for providing communication includes an outleet in the top wall of said cover and a valve in said outlet, said valve being biased to its open position when said cover is in position about said housing and being biased to its closed position when said cover is inverted, and means for holding said valve in its open position when said cover is inverted and positioned on said housing.

9. A liquid pump of the pulses discharge type comprising a housing, a block arranged in said housing and having a chamber provided with an intake port and an exhaust port, said housing having an inlet passage opening upwardly and in communication with said intake port, means for preventing reverse flow of fluid through said intake port, pump means for producing a flow of liquid from said chamber through said exhaust port, a detachable container having a bottom outlet positioned to register with the opening of said inlet passage for supplying liquid to said intake port, the top wall of said housing and the bottom wall of said container being of substantially the same size and configuration and including interengaging positioning means on said container and top wall for maintaining said container alined with said top wall, means sealing said container and said housing for preventing leakage therebetween, a valve in the outlet of said container, means on said block for opening said valve upon movement of said container into position on said housing, said valve closing to prevent flow of liquid from said container when said container is removed from said housing, and means for conducting liquid from said exhaust port to a point of use.

10. A liquid pump of the pulsed discharge type comprising a cylinder block including two chambers in communication with one another, a piston mounted for reciprocation in one of said chambers, said cylinder block including an inlet forming a source of liquid supply to said second chamber, an inlet port between said inlet and the second of said chambers, a spring biased inlet valve slidably mounted within said second chamber and biased to close said port, said valve having a streamlined exterior and its longitudinal axis disposed parallel to the flow of liquid through said second chamber, and walls defining an outlet passage opposite the inlet port of frusto-conical shape, the outlet passage being located at the apex of the conical configuration.

11. The liquid pump of claim 10 in which said inlet valve has a stem slidably supported in a spider the spokes of which terminate in a rim portion, said second chamber having a diameter near the outlet passage greater than the diameter of the portion near the inlet port to provide a ledge, said rim of said spider being disposed to rest against said ledge, and said walls forming said conical shape being part of a fitting inserted into said second passage the end portion of which engages said rim to clamp said inlet valve into its centrally located position within said second chamber.

12. The pump of claim 11 in which there are provided mounting ears extending outwardly of the walls forming said piston chamber, characterized by the fact that one of said ears is integral both with the walls of said piston chamber and said second chamber.

13. The liquid pump of claim 11 wherein said two chambers have their longitudinal axes at right angles to one another and wherein said inlet comprises a third chamber in said block.

14. The pump of claim 13 in which said cylinder block has a post extending in an upward direction from the upper wall of said second chamber through a part of said third chamber, a container having a fluid opening in its bottom wall, a valve disposed in said opening normally closing the same, and means operable by the engagement of said post with said valve for opening said valve for flow of liquids into said third chamber.

15. The pump of claim 14 in which the walls of said cylinder block forming said third chamber terminate upwardly of the upper face of said post and in which said container has downwardly extending walls closely fitting against the inner surfaces of the upwardly extending walls of said third chamber, and sealing means between said closely fitting walls to prevent leakage of said liquid therebetween.

16. The pump of claim 12 in which there is provided a pressure control port extending between said second and third chambers and in which said cylinder block is provided with an outwardly extending cylindrical boss in alinement with said pressure control port, and a throttling valve disposed within said boss for predetermining the size of the flow passage between said second and third chambers.

17. A liquid pump of the pulsed discharge type comprising a cylinder block formed to provide two cylindrical members on axes at right angles to one another, said members having respective cylindrical chambers therein, a piston mounted for reciprocation in the chamber of one of said members, said cylinder block providing an inlet in communication with the chamber of said one member, an inlet valve in said inlet for preventing the return of liquid from said chamber of said one member to said inlet, said block having an outlet passage communicating with said chamber of said one member, and mounting ears extending outwardly of the walls of said members characterized by the fact that one of said ears is integral with the walls of both said members.

18. An oral hygiene apparatus of the water jet type including in combination:
a liquid pump of the pulsed discharge type including an intake chamber having a top opening through which it may be filled with liquid,
said pump having a reciprocating piston movable within a vertically disposed cylinder, the maximum stroke of which is less than the length of the cylinder for developing in the region above the piston rapidly rising pressure on the pressure stroke of the piston and suction during the return stroke of the piston,
wall structure separating said intake chamber and the region above said piston and having an intake opening therethrough,
an intake valve for closing said intake opening on the pressure stroke of said piston and for opening said intake opening to permit water to flow through said opening on the return stroke of said piston,
a bypass passage extending directly from the region above said piston to said intake chamber and including variable bypass regulating means for controlling the magnitude of pressure during the pressure stroke of said piston,
an outlet opening from said region above said piston including means for securing to said outlet opening a tube of relatively non-expansible material having a nozzle for delivering pulsating jets of water produced by said piston,
a water reservoir having bottom wall structure including a hollow outwardly extending boss of shape complementary to said top opening of said intake chamber,
sealing means between said boss and the wall of said top opening to prevent leakage,
a valve positioned within said boss and biased to its closed position, and
means associated with said intake chamber for moving said valve within said boss to its open position as said boss is moved into said top opening of said intake chamber for permitting gravity flow of liquid from said reservoir to said intake chamber and through said inlet valve when open.

19. A liquid pump of the pulsed discharge type comprising a cylinder block including two chambers in communication with one another, a piston mounted for reciprocation in one of said chambers, said cylinder block including an inlet forming a source of liquid supply to said second chamber, an inlet port between said inlet and the second of said chambers, a spring biased inlet valve slidably mounted within said second chamber and biased to close said port, said valve having a streamlined exterior and its longitudinal axis disposed parallel to the flow of liquid through said second chamber, and walls defining an outlet passage opposite the inlet port and remote therefrom.

20. The liquid pump of claim 19 in which said inlet valve has a stem slidably supported in a spider the spokes of which terminate in a rim portion, said second chamber having a diameter near the outlet passage greater than the diameter of the portion near the inlet port to provide a ledge, said rim of said spider being disposed to rest against said ledge, and said walls forming said outlet passage being part of a fitting inserted into said second passage the end portion of which engages said rim to clamp said inlet valve into its centrally located position within said second chamber.

21. A liquid pump comprising a block having therein a piston chamber having an intake port and an exhaust port, a piston mounted for reciprocation in said chamber, said block having an inlet chamber communicating with said intake port and extending upwardly therefrom, means including a motor for driving said piston, a housing for enclosing said block and said motor, the top wall of said housing having an opening adjacent the upper end of said inlet chamber and registering therewith, means about the upper end of said inlet chamber and engaging said housing about said opening for preventing the passage of fluid from the top of said housing onto the motor therein, means for conducting liquid from said exhaust port to a point of use, a detachable container having a bottom outlet positioned to register with said opening in said housing for supplying liquid to said inlet chamber, said container having a boss extending downwardly therefrom about the opening therein and having a size and configuration to project into said inlet chamber, a valve in the outlet of said container, means in said inlet chamber for opening said valve upon movement of said container into position in said inlet chamber, and means sealing said boss on said container and the wall of said inlet chamber for preventing the passage of liquid from said inlet chamber onto said housing.

References Cited

UNITED STATES PATENTS

| | | | |
|---|---|---|---|
| 313,879 | 3/1885 | Nagle | 103—41 |
| 1,848,621 | 3/1932 | Goldwitzer | 128—62.1 |
| 1,995,424 | 3/1935 | Guinness | 128—62.1 |
| 2,905,194 | 9/1959 | Smith et al. | 138—107 |
| 3,288,169 | 11/1966 | Moss | 138—107 |

LAWRENCE W. TRAPP, Primary Examiner.

UNITED STATES PATENT OFFICE
CERTIFICATE OF CORRECTION

Patent No. 3,393,673                          July 23, 1968

John W. Mattingly

It is hereby certified that error appears in the above numbered patent requiring correction and that the said Letters Patent should read as corrected below.

Column 1, line 16, for "the", second occurrence, read -- a --; line 34, for "for" read -- of --; column 2, line 17, after "drawings" insert -- in --; line 39, for "elevational" read -- elevation --; column 3, line 69, for "which" read -- whom --; column 5, line 6, for "gun" read -- gum --; column 7, line 40, for "opening" read -- open --; column 8, line 48, for "pulses" read -- pulsed --; column 9, lines 21 and 26, for the claim reference numeral "11", each occurrence, read -- 10 --; line 46, for the claim reference numeral "12" read -- 13 --.

Signed and sealed this 11th day of March 1969.

(SEAL)

Attest:

Edward M. Fletcher, Jr.
Attesting Officer

EDWARD J. BRENNER
Commissioner of Patents